United States Patent
Luo et al.

(10) Patent No.: US 10,023,719 B2
(45) Date of Patent: Jul. 17, 2018

(54) TOUGHENED POLYOLEFIN NANOCOMPOSITES USING SILANE FUNCTIONALIZED POLYOLEFINS

(71) Applicant: ExxonMobil Chemical Patents Inc., Baytown, TX (US)

(72) Inventors: Shuji Luo, Basking Ridge, NJ (US); Andy H. Tsou, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 145 days.

(21) Appl. No.: 14/877,245

(22) Filed: Oct. 7, 2015

(65) Prior Publication Data

US 2016/0222187 A1 Aug. 4, 2016

Related U.S. Application Data

(60) Provisional application No. 62/110,755, filed on Feb. 2, 2015.

(51) Int. Cl.
C08K 3/36 (2006.01)
C08K 3/013 (2018.01)

(52) U.S. Cl.
CPC ................ *C08K 3/36* (2013.01); *C08K 3/013* (2018.01)

(58) Field of Classification Search
CPC ....................................................... C08K 3/36
See application file for complete search history.

(56) References Cited

U.S. PATENT DOCUMENTS

| | | | |
|---|---|---|---|
| 5,229,022 A | 6/1993 | Song et al. | |
| 5,973,053 A | 10/1999 | Usuki et al. | |
| 6,916,536 B1 | 7/2005 | Hammen et al. | |
| 8,426,659 B2 | 4/2013 | Holtcamp et al. | |
| 8,501,894 B2 | 8/2013 | Crowther et al. | |
| 8,623,974 B2 | 1/2014 | Jiang et al. | |
| 8,669,326 B2 | 3/2014 | Hagadorn et al. | |
| 8,669,330 B2 | 3/2014 | Stewart | |
| 8,754,170 B2 | 6/2014 | Hagadorn et al. | |
| 8,816,027 B2 | 8/2014 | Crowther et al. | |
| 8,840,996 B2 | 9/2014 | Tsou et al. | |
| 8,841,394 B2 | 9/2014 | Crowther et al. | |
| 8,940,839 B2 | 1/2015 | Hagadorn et al. | |
| 8,993,702 B2 | 3/2015 | Crowther et al. | |
| 2002/0183473 A1* | 12/2002 | Matyjaszewski | C08F 290/02 526/335 |
| 2003/0130401 A1 | 7/2003 | Lin et al. | |
| 2005/0014905 A1 | 1/2005 | Chung et al. | |
| 2006/0128868 A1 | 6/2006 | Martter et al. | |
| 2009/0018290 A1 | 1/2009 | Casty et al. | |
| 2009/0318644 A1 | 12/2009 | Brant et al. | |
| 2010/0227162 A1 | 9/2010 | Patil et al. | |
| 2011/0048536 A1 | 3/2011 | Rivard et al. | |
| 2012/0171140 A1 | 7/2012 | Bui et al. | |
| 2012/0245293 A1 | 9/2012 | Crowther et al. | |
| 2012/0245300 A1 | 9/2012 | Crowther et al. | |
| 2013/0158180 A1 | 6/2013 | Tsou et al. | |
| 2014/0088217 A1 | 3/2014 | Ng et al. | |
| 2014/0088264 A1 | 3/2014 | Crowther et al. | |
| 2014/0121316 A1 | 5/2014 | Monsallier et al. | |
| 2014/0275433 A1 | 9/2014 | Ng et al. | |
| 2014/0336324 A1 | 11/2014 | Tsou et al. | |
| 2016/0145361 A1 | 5/2016 | Tsou et al. | |

FOREIGN PATENT DOCUMENTS

| | | |
|---|---|---|
| EP | 1 008 464 B | 5/2004 |
| EP | 1 493 765 | 1/2005 |
| JP | S63275664 A | 11/1988 |
| WO | 2004/024800 | 3/2004 |
| WO | 2009/155471 | 12/2009 |
| WO | 2009/155472 | 12/2009 |
| WO | 2009/155510 | 12/2009 |
| WO | 2009/155517 | 12/2009 |
| WO | 2012/134716 | 10/2012 |
| WO | 2013/041151 | 3/2013 |
| WO | 2013/116196 | 8/2013 |
| WO | 2016/093934 A | 6/2016 |

OTHER PUBLICATIONS

Bracho et al., "Functionalization of Silica Nanoparticles for Polypropylene Nanocomposite Applications, Journal of Nanomaterials," vol. 2012 (2012), pp. 1-8.*
U.S. Appl. No. 61/704,611, filed Sep. 24, 2012, Kulkarni et al.
U.S. Appl. No. 61/704,725, filed Sep. 24, 2012, Crowther et al.
U.S. Appl. No. 61/860,407, filed Jul. 31, 2013, Tsou et al.
U.S. Appl. No. 61/866,702, filed Aug. 16, 2013, Blok et al.
Bracho et al., "*Functionalization of Silica Nanoparticles for Polypropylene Nanocomposite Applications*," Journal of Nanomaterials, vol. 2012 (2012) pp. 1-8.
Gelest, Inc. "*Silane Coupling Agents: Connecting Across Boundaries*," (2006) pp. 1-60.
Mulhaupt et al., "*Functional Polypropylene Blend Compatibilizers*," Makromoledulare Chemie, Macromolecular Symposia, vol. 48/49 (1991) pp. 317-332.
Pelto et al., "*Surface Modification of Nanosilica for PP Composites*," Materials Science Forum, vol. 714, (2012) pp. 91-98.

* cited by examiner

*Primary Examiner* — Robert Harlan

(57) ABSTRACT

A method of forming a polyolefin-filler hybrid comprising combining vinyl/vinylidene-terminated polyolefin (VTP) and halosilane to form a silane functionalized polyolefin, followed by combining the silane functionalized polyolefin with a hydroxyl-containing filler, and/or combining the silane functionalized polyolefin with water and combining with hydroxyl-containing filler; to form a polyolefin-filler hybrid.

13 Claims, 1 Drawing Sheet

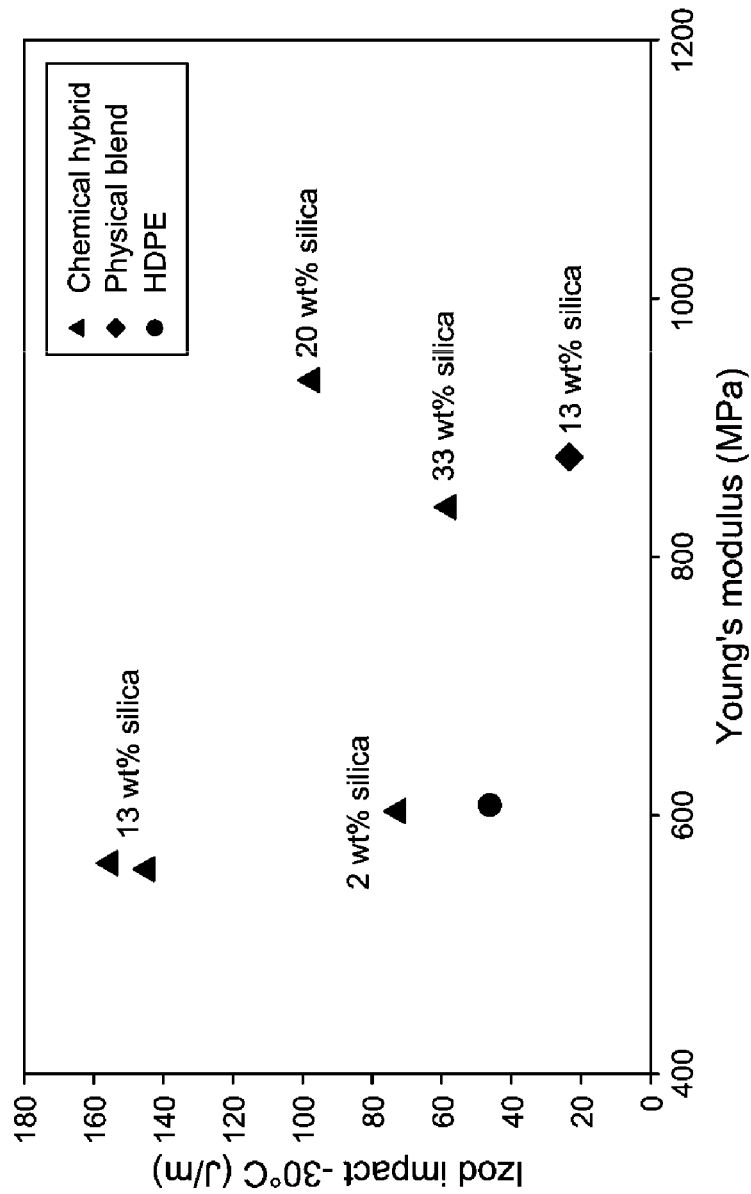

TOUGHENED POLYOLEFIN NANOCOMPOSITES USING SILANE FUNCTIONALIZED POLYOLEFINS

CROSS-REFERENCE TO RELATED APPLICATIONS

This invention claims priority to and the benefit of U.S. Ser. No. 62/110,755, filed Feb. 2, 2015 and is related to U.S. Ser. No. 62/068,043 filed Oct. 24, 2014, and U.S. Ser. No. 62/083,347 filed Nov. 24, 2014, fully incorporated herein by reference.

FIELD OF THE INVENTION

The present invention relates to functionalized polyolefins useful for forming compositions containing hydroxyl-containing fillers and polyolefins.

BACKGROUND OF THE INVENTION

It is desirable to add fillers to polymer compositions to improve properties such as heat distortion temperatures, dimensional stability, and stiffness. However, this presents some problems. First, many fillers are not compatible with polymers, especially polyolefin polymers which tend to be highly non-polar. A further problem is that there is an increasing desire to use nanoparticles (less than 0.1 μm average particle diameter) to improve the performance of thin films and micro and nano-fibers made from polyolefins. Such nanoparticles have very high surface areas so they disperse even more poorly than larger particles.

Dispersing polar nanofillers in nonpolar polyolefins has always been challenging. Despite the theoretical promises of having a polyolefin nanocomposite with nano-dispersed silica clusters for enhancements in mechanical stiffness, strength, rheological melt strength, shear thinning, and in thermal heat distortion resistance, there are currently no polyolefin-silica nanocomposites commercially available. What is needed is a way to thoroughly disperse polar nanoparticles such as silica into a polyolefin (e.g., polyethylene and/or polypropylene) matrix. The present invention(s) is directed to such an end.

Related disclosures include U.S. Pat. Nos. 8,840,996; 8,669,326; 5,229,022; US 2014/088264; US 2014/275433; US 2009/0318644; WO 2004/024800; WO 2009/155517; WO 2009/155510; WO 2009/155471; WO 2009/155472; WO 2013/041151; Gelest Inc., "Silane Coupling Agents: Connecting Across Boundaries" (2006); and U.S. Ser. No. 61/866,702, filed Aug. 16, 2013.

SUMMARY OF THE INVENTION

Disclosed is a method of forming a polyolefin-filler hybrid comprising (or consisting essentially of, or consisting of) combining vinyl/vinylidene-terminated polyolefin (VTP) and halosilane to form a silane functionalized polyolefin, followed by combining the silane functionalized polyolefin with a hydroxyl-containing filler preferably having an average particle diameter of less than 0.1 μm, and/or combining the silane functionalized polyolefin with water and combining with hydroxyl-containing filler preferably having an average particle diameter of less than 0.1 μm; to form a polyolefin-filler hybrid.

Also disclosed is a polyolefin-filler hybrid preferably made by the inventive process comprising (or consisting essentially of, or consisting of) an associated blend of a silane functionalized polyolefin and a hydroxyl-containing filler (HCF):

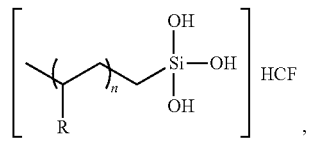

wherein R is selected from hydrogen and C1 to C10 linear alkyls; and "n" has a value within the range from 40 to 1000.

DESCRIPTION OF THE FIGURES

FIG. 1 is a plot of the Izod impact as a function of Young's Modulus for the Example compositions and comparative High Density Polyethylene (HDPE).

DETAILED DESCRIPTION OF THE INVENTION

The present invention is directed to functionalized polyolefins that allow grafting to hydroxyl-containing inorganic fillers such as silica, as well as hydroxyl-containing carbon based fillers. Functionalization of polyolefins with halosilanes allows the grafting of the functionalized polyolefins onto silica surfaces to create polyolefin-filler hybrid particles, or so-called "hairy" particles. In a preferred embodiment, narrow molecular weight distribution (Mw/Mn) polyolefins, especially HDPE, are most useful as the grafting polymer and the matrix, because these two tend to be more similar with respect to their molecular weights, enhancing the dispersion of the hybrid particles. These polyolefin-filler hybrid particles can be readily dispersed in polyolefins, leading to significant enhancements in mechanical strength, rheological, and improved thermal properties without compromising the toughness of the polyolefins. Functionalization of vinyl-terminated polyolefins with halosilanes allows the grafting of the silane-functionalized polyolefins (PO) onto silica nanoparticles. The resultant PO-h-silica ("polyolefin-silica chemical hybrid" or just "polyolefin-filler hybrid") can then be dispersed in POs for the preparation of polyolefin nanocomposites.

These ends are accomplished at least in part by a method of forming a polyolefin-filler hybrid comprising (or consisting essentially of, or consisting of) combining vinyl/vinylidene-terminated polyolefin (VTP) and halosilane to form a silane functionalized polyolefin, followed by combining the silane functionalized polyolefin with a hydroxyl-containing filler preferably having an average particle diameter of less than 0.1 μm, and/or combining the silane functionalized polyolefin with water and combining with hydroxyl-containing filler preferably having an average particle diameter of less than 0.1 μm; to form a polyolefin-filler hybrid. Preferably, the VTP most useful has a molecular weight distribution (Mw/Mn) of less than 3.0 or 4.0, or as further described herein.

In any embodiment the inventive polyolefin-filler hybrid, preferably made by the inventive described herein, comprises (or consists essentially of, or consists of) an associated blend of a silane functionalized polyolefin and a hydroxyl-containing filler (HCF):

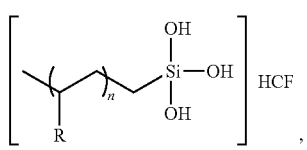

wherein R is selected from hydrogen and C1 to C10 linear alkyls; and "n" has a value within the range from 40 to 1000. By "associated blend", what is meant is that at least one particle of the hydroxyl-containing filler is associated with at least one molecule of silane-modified polyolefin as by a covalent, ionic, or other chemical bonding. Preferably, the polyolefin-filler hybrid has a grafting density within the range from 0.01, or 0.02, or 0.04 chain/nm$^2$ to 0.09, or 0.10, or 0.12, or 0.14, or 0.16 chain/nm$^2$.

In any embodiment, the silane functionalized polyolefins are silane functionalized polypropylenes (homopolymers, copolymers, elastomers), polyethylenes (HDPE, LDPE, LLDPE, plastomers), or ethylene-propylene copolymers (copolymers, terpolymers, diene terpolymers); preferably the polyolefin is a high density polyethylene. As can be seen in the inventive reaction scheme described above, the polyolefin portion of the functionalized polyolefins are derived from vinyl/vinylidene-terminated polyolefins ("VTPs").

In any embodiment, the hydroxyl-containing filler is selected from the group consisting of silicates, aluminates, borates, silica, quartz, glass, alumina, alumino-silicates, silicon, copper, copper oxide, tin, tin oxide, talc, iron oxide, chromium oxide, steel, iron, nickel, zinc, lead, surface treated or oxidized carbon, and calcium carbonate, and mixtures thereof. Preferably, the hydroxyl-containing filler is a silica-containing particulate filler such as fumed silica, precipitated, sol-gel, colloidal, chemically treated silica, calcined silica, and alumina and/or phosphate derivatives thereof. Preferably, the hydroxyl-containing filler is less than 0.1 μm in average particle diameter. More preferably, the hydroxyl-containing filler has an average particle diameter within a range from 0.1, or 1 nm to 10, or 20 nm. As described herein, "average particle diameter" is for primary particles, which may then form branched, chain-like aggregates a few tenths of a micron long. Average particle diameter is determined by first determining the surface area as determined by calculation using a nitrogen adsorption method of Brunauer (S. Brunauer, et al., 60 J. AM. CHEM. Soc., 309 (1938)), and the value used to calculate particle diameter.

The inventive method of forming the polyolefin-filler hybrid includes combining at least the primary reactants, the VTP and halosilane, under conditions (temperature, solvent, etc.) that facilitate chemical bond formation between the vinyl/vinylidene terminal portion of the VTP with the silane, preferably through the silicon atom. Preferably, the VTP and halosilane are combined at a temperature of at least 90 or 100° C., or within a range from 90 or 100° C. to 110 or 120 or 130° C.

In any embodiment, the VTP and halosilane are additionally combined with a vinylsiloxane/metal catalyst, such as a platinum (0) vinyl-containing organosilane. In any additional embodiment, after combining the catalyst, additional halosilane is combined with the reactants and maintained at a temperature of at least 90° C. for at least 5, or 8, or 10 hours.

In any embodiment, the step of combining the hydroxyl-containing filler with the halosilane/VTP reaction mixture is also at a temperature of at least 90° C. (or in the range stated above) for at least an additional 5, or 8, or 10 hours.

In any embodiment of the combining step(s), it is preferable that a solvent be used that has a dielectric constant within a range from 2.0, or 2.5 to 3.0, or 4.0, or 5.0, or 6.0, or 10.0 at 20° C. Most preferably, aromatic solvents such as benzene, xylene, toluene, or halogenated benzenes are used as a solvent.

In any embodiment, the halosilane is a chemical compound containing at least one H—Si moiety and at least one halogen-Si moiety, either consisting of just the hydrogen, silicon and halogen atoms or also consisting of a hydrocarbon moiety such as methyl, ethyl, butyl, etc. Most preferably, the halosilane is selected from the group consisting of trichlorosilane, tribromoasilane, chlorodimethylsilane, bromodimethylsilane, dibromomethylsilane, dichloromethylsilane, and combinations thereof.

In any embodiment, the polyolefin-filler hybrid is formed into useful nanocomposites by combining with a polyolefin, most preferably a similar or same polyolefin (with or without vinyl/vinylidene terminal ends) as the VTP. Thus, forming the inventive nanocomposites comprises combining the polyolefin-filler hybrid with at least one polyolefin selected from polypropylene, polyethylene, and ethylene-propylene copolymer. Most preferably, the VTP used to form the hybrid and the additional polyolefin will have a similar MWD (Mw/Mn), in other words, both may have an MWD of less than 4.0 or 3.0, or other range described herein. In certain embodiments, the inventive method of forming the polyolefin-filler hybrid may be such that excess VTP is present that does not associate with filler. In this instance, or in addition to adding a polyolefin, this additional VTP is the added polyolefin to form the nanocomposite, or at least part of the additional polyolefin forming the nanocomposite. In any case, in any embodiment the polyolefin-filler hybrid is present in the nanocomposite within a range from 0.50, or 1.0, or 5 wt % to 6, or 10, or 15, or 20, or 25, or 30, or 35, or 40 wt % based on the weight of the polyolefin and silane functionalized polyolefin.

The inventive polyolefin nanocomposites have improved features over prior polyolefin nanocomposites that make them ideal for forming articles. In any embodiment, the polyolefin nanocomposites have a Young's Modulus of greater than 500, or 550, or 600 MPa, or within a range from 500, or 550 MPa to 1000, or 1200, or 1400 MPa. Also, in any embodiment, the nanocomposites having an Izod Impact (−30° C.) of greater than 20, or 50, or 100 J/m, or within a range from 20, or 50 J/m to 100, or 150 J/m. Suitable articles where the inventive nanocomposites are useful include roto-molded articles, pipes, automotive components, and constructional materials.

The vinyl/vinylidene-terminated polyolefins ("VTP") useful in the inventive silane functionalized polyolefins described herein can be made in any number of ways. By "vinyl/vinylidene", what is meant is that the polyolefin may be a mixture of both vinyl- and vinylidene-terminated polyolefins, or the polyolefin may be substantially all one form or the other. Preferably, the VTP's useful herein are polymers as first described in US 2009/0318644 having at least one terminus ($CH_2=CHCH_2$-oligomer or polymer) represented by formula (7):

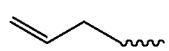 (7)

allylic vinly end group where the "〰〰" here represents the "PO" portion of the inventive functionalized polyolefins. In a preferred embodiment the allyl chain ends are represented by the formula (8):

(8)

The amount of allyl chain ends is determined using $^1$H NMR at 120° C. using deuterated tetrachloroethane as the solvent on a 500 MHz machine, and in selected cases confirmed by $^{13}$C NMR. In any case, Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl-terminated propylene polymers in Resconi et al, 114, J. Am. Chem. Soc., pp. 1025-1032 (1992) that are useful herein.

The vinyl/vinylidene-terminated propylene-based polymers may also contain an isobutyl chain end. "Isobutyl chain end" is defined to be an oligomer having at least one terminus represented by the formula (9):

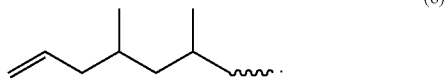
(9)

In a preferred embodiment, the isobutyl chain end is represented by one of the following formulae (10):

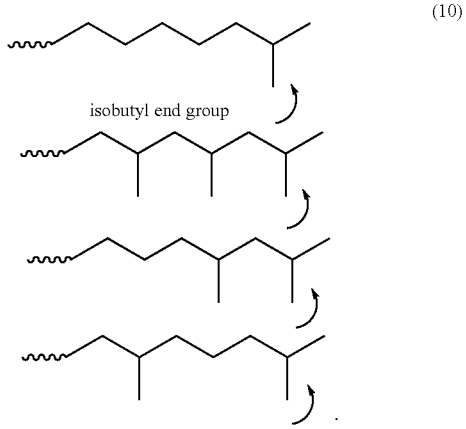
(10)

The percentage of isobutyl end groups is determined using $^{13}$C NMR (as described in the example section) and the chemical shift assignments in Resconi for 100% propylene oligomers. Preferably, the vinyl/vinylidene-terminated polymers described herein have an allylic terminus, and at the opposite end of the polymer an isobutyl terminus.

The VTPs can be made by any suitable means, but most preferably the VTPs are made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 1000 Å$^3$) perfluorinated boron activator, for example, as described in US 2012/0245299.

The vinyl/vinylidene-terminated polyolefin can be any polyolefin having a vinyl/vinylidene-terminal group, and is preferably selected from the group consisting of vinyl/vinylidene-terminated isotactic polypropylenes, atactic polypropylenes, syndiotactic polypropylenes, propylene-butene copolymers, propylene-hexene copolymers, and propylene-ethylene copolymers (wherein the copolymers may be random, elastomeric, impact and/or block), and combinations thereof, each having a number-average molecular weight (Mn) of at least 3000 g/mole. In any embodiments, the VTP may be a copolymer or terpolymer wherein the C2 content (ethylene derived units) of the vinyl/vinylidene-terminated polyolefin is from 3 to 50 wt %, the C3 content (propylene derived units) is from 50 to 97 wt %; in yet another embodiment, the VTP may contain a third comonomer, thus, the C4 through C14 content (units derived from C4 to C14 α-olefins or dienes) is from 5 to 30 wt % in those embodiments, while the C2 content is from 5 to 50 wt % and the C3 content is from 20 to 90 wt %. Most preferably, the VTP is a polyethylene, especially a high density polyethylene, wherein the high density polyethylene preferably has a density of at least 0.940, or 0.945, or 0.950 g/cm$^3$.

In any embodiment, greater than 70, or 80, or 90, or 94, or 96% of the VTP comprises terminal vinyl groups; or within the range of from 50, or 60 wt % to 70, or 80, or 90, or 95, or 98 or 99%. As described above, the vinyl/vinylidene-terminated polyolefins preferably have a number average molecular weight (Mn) value of at least 1000, or 5000, or 20,000 g/mole, or within the range of from 200, or 400, or 500, or 1,000, or 10,000, or 20,000 g/mole to 20,000, or 30,000, or 40,000 g/mole. The vinyl/vinylidene-terminated polyolefins preferably have a weight-average molecular weight (Mw) value within the range from 3,000, or 4,000, or 5,000, or 10,000 g/mole to 25,000, or 30,000, or 40,000, or 50,000 g/mole. The VTPs most useful herein have a molecular weight distribution (Mw/Mn) of less than 3.0 or 4.0 or 5.0, or within a range of from 1.8, or 2.0 to 3.0, or 4.0, or 4.5, or 5.0. Preferably, the VTP useful herein is amorphous polypropylene, and desirably has a glass transition temperature (Tg) of less than 10 or 5 or 0° C., more preferably less than −10° C.; or within the range of from 0, or −5, or −10° C. to −30, or −40, or −50° C. or as described herein.

The VTPs are preferably linear, meaning that there is no polymeric or oligomeric branching from the polymer backbone, or described quantitatively, having a branching index "g" (or g'$_{(vis\ avg)}$) of at least 0.90 or 0.96 or 0.97 or 0.98, wherein the "branching index" is well known in the art and measurable by published means, and the value of such branching index referred to herein is within 10 or 20% of the value as measured by any common method of measuring the branching index for polyolefins as is known in the art such as in US 2013/0090433.

A particularly preferred VTP is one wherein the vinyl terminated polyolefin is a compound or mixture of compounds represented by the formula (11):

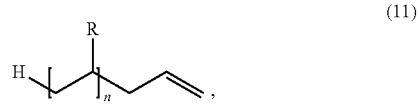
(11)

wherein each "R" is selected from hydrogen and C1 to C4 or C10 alkyls, preferably hydrogen or methyl, or a mixture thereof; and n is an integer from 20, or 40 to 100, or 200, or 500, or 800, or 1000, or 1500, or 2000. It is these VTPs that are reacted, under suitable conditions, with a functionalizing agent to form the functionalized polyolefins which can react with the functionalized silanes described herein to form silane functionalized polyolefins.

The various descriptive elements and numerical ranges disclosed herein for the inventive silane functionalized polyolefin, polyolefin-filler hybrid, polyolefin nanocomposite, and methods of forming such can be combined with other descriptive elements and numerical ranges to describe the invention(s); further, for a given element, any upper numerical limit can be combined with any lower numerical limit described herein, including the examples. The features of the inventions are demonstrated in the following non-limiting examples.

EXAMPLES

Preparation of Inventive HDPE-silica Chemical Hybrid

Example 1

A round-bottomed flask was charged with HDPE (High Density Polyethylene) (number average molecular weight 28,000 g/mole by Proton Nuclear Magnetic Resonance, —CH=CH$_2$ end-functionalized) (10.0 grams, 0.355 millimoles) and anhydrous o-xylene (300 milliliters). The HDPE was prepared using a single site catalyst and having a molecular weight distribution within a range from 1.8 to 3.0. The flask was equipped with a chilled-water condenser. The mixture was heated to 110° C. with vigorous stirring under nitrogen to form a homogeneous solution. The solution was cooled down and a pre-mixed solution of trichlorosilane (4.0 grams, 29.5 millimoles) and platinum (0)-1,3-divinyl-1,1,3,3-tetramethyldisiloxane complex in o-xylene was added. The reaction mixture was heated to 110° C. Additional trichlorosilane (4.0 grams, 29.5 millimoles) was added after 2 hours. The mixture was maintained at 110° C. for 16 hours, after which the mixture was cooled down and the solvent and unreacted trichlorosilane were removed under vacuum. $^1$H NMR showed that 90% of the vinyl end group in the starting HDPE was converted to silyl end group. The silyl-terminated HDPE product was brought into an N$_2$-filled glovebox. A pre-mixed suspension of fumed silica (Sigma-Aldrich, 7 nm diameter measured as described above, specific surface area 395 m$^2$/g, 0.21 gram, 3.5 millimoles) in 1,2,4-trichlorobenzene (TCB, 10.5 grams), anhydrous pyridine (0.1 gram, 1.26 millimoles) and additional TCB (300 milliliters) were added. The mixture was heated to 130° C. with stirring for 16 hours. After that, the mixture was cooled down and the product was precipitated out by methanol and washed twice by methanol, then thoroughly dried under vacuum. The 2-step reaction scheme is shown in FIG. 1. There are two possible reactions occurring in the grafting step. One is reaction of chlorosilyl group directly with silanol on silica surface, which generates one or more siloxane linkage between the HDPE and silica surface and HCl which then is neutralized by pyridine. The other is reaction of partially or fully hydrolyzed chlorosilyl group with silanol on silica surface, which generates one or more siloxane linkage between the HDPE and silica surface. The latter reaction is possible in the presence of trace amount of water, likely from the solvent. Since the TCB solvent is not anhydrous, the grafting reaction here is most likely through the second pathway in FIG. 1.

The 2-step reaction scheme is shown in Scheme (i) below. There are two possible reactions occurring in the grafting step. One is reaction of chlorosilyl group directly with silanol on silica surface, which generates one or more siloxane linkage between the HDPE and silica surface and HCl which then is neutralized by pyridine. The other is reaction of partially or fully hydrolyzed chlorosilyl group with silanol on silica surface, which generates one or more siloxane linkage between the HDPE and silica surface. The latter reaction is possible in the presence of trace amount of water, likely from the solvent. Below are a representative reaction Schemes (i) without water, and (ii) with water, of HDPE hybrid formation:

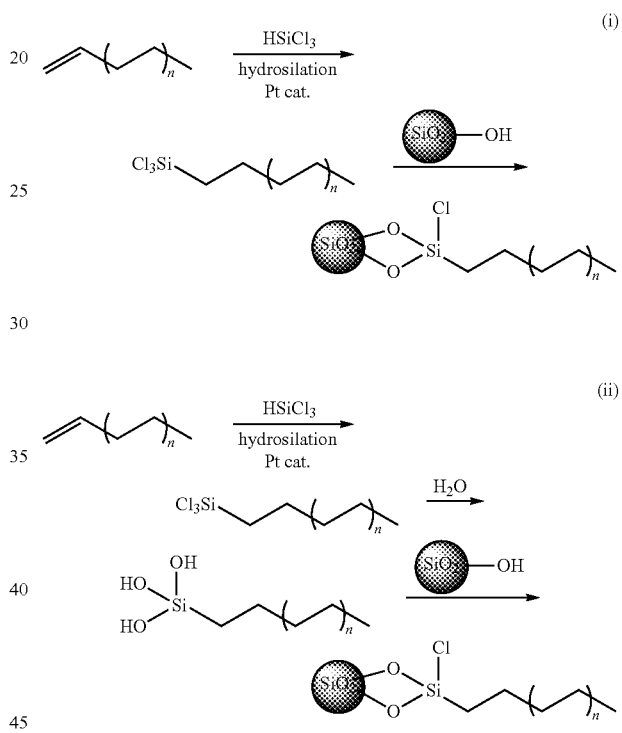

Preparation of Inventive HDPE-silica Chemical Hybrid

Example 2

A round-bottomed flask was charged with HDPE (High Density Polyethylene) (number average molecular weight 34,000 g/mole by Proton Nuclear Magnetic Resonance, —CH=CH$_2$ end-functionalized) (10.0 grams, 0.294 millimoles) and anhydrous o-xylene (300 milliliters). The HDPE was prepared using a single site catalyst and having a molecular weight distribution within a range from 1.8 to 3.0. The flask was equipped with a chilled-water condenser. The mixture was heated to 110° C. with vigorous stirring under nitrogen to form a homogeneous solution. The solution was cooled down and a pre-mixed solution of trichlorosilane (3.0 grams, 22.1 millimoles) and platinum (0)-1,3-divinyl-1,1,3,3-tetramethyldisiloxane complex in o-xylene was added. The reaction mixture was heated to 110° C. Additional trichlorosilane (3.0 grams, 22.1 millimoles) was added after 2 hours. The mixture was maintained at 110° C. for 16 hours, after which the mixture was cooled down and the solvent and unreacted trichlorosilane were removed under vacuum. $^1$H NMR showed that 90% of the vinyl end group in the starting HDPE was converted to silyl end group. The silyl-terminated HDPE product was brought into an N$_2$-filled glovebox. A pre-mixed suspension of fumed silica (7 nm diameter, specific surface area 395 m$^2$/g, 1.5 grams, 25 millimoles) in anhydrous o-xylene (75 grams), anhydrous pyridine (0.1 gram, 1.26 millimoles) and anhydrous xylene (300 milliliters) were added. The mixture was heated to 110° C. with stirring for 16 hours. After that, the mixture was cooled down and the solvent was removed under vacuum. The product was washed by methanol and thoroughly dried under vacuum.

Preparation of Inventive HDPE-silica Chemical Hybrid

Example 3

A round-bottomed flask was charged with HDPE (High Density Polyethylene) (number average molecular weight 26,000 g/mole by Proton Nuclear Magnetic Resonance, —CH=CH$_2$ end-functionalized) (10.0 grams, 0.386 millimoles) and anhydrous o-xylene (300 milliliters). The HDPE was prepared using a single site catalyst and having a molecular weight distribution within a range from 1.8 to 3.0. The flask was equipped with a chilled-water condenser. The mixture was heated to 110° C. with vigorous stirring under nitrogen to form a homogeneous solution. The solution was cooled down and a pre-mixed solution of trichlorosilane (4.0 grams, 29.5 millimoles) and platinum (0)-1,3-divinyl-1,1,3,3-tetramethyldisiloxane complex in o-xylene was added. The reaction mixture was heated to 110° C. Additional trichlorosilane (4.0 grams, 29.5 millimoles) was added after 2 hours. The mixture was maintained at 110° C. for 16 hours, after which the mixture was cooled down and the solvent and unreacted trichlorosilane were removed under vacuum. $^1$H NMR showed that 90% of the vinyl end group in the starting HDPE was converted to silyl end group. The silyl-terminated HDPE product was brought into an N$_2$-filled glovebox. A pre-mixed suspension of fumed silica (7 nm diameter, specific surface area 395 m$^2$/g, 1.5 grams, 25 millimoles) in TCB (75 grams), anhydrous pyridine (0.1 gram, 1.26 millimoles) and additional TCB (300 milliliters) were added. The mixture was heated to 110° C. with stirring for 16 hours. After that, the mixture was cooled down and the product was precipitated out by methanol and washed twice by methanol, then thoroughly dried under vacuum. Yield 10.9 grams (95%).

Preparation of Inventive HDPE-silica Chemical Hybrid

Example 4

A round-bottomed flask was charged with HDPE (High Density Polyethylene) (number average molecular weight 26,000 g/mole by Proton Nuclear Magnetic Resonance, —CH=CH$_2$ end-functionalized) (10.0 grams, 0.386 millimoles) and anhydrous o-xylene (300 milliliters). The HDPE was prepared using a single site catalyst and having a molecular weight distribution within a range from 1.8 to 3.0. The flask was equipped with a chilled-water condenser. The mixture was heated to 110° C. with vigorous stirring under nitrogen to form a homogeneous solution. The solution was cooled down and a pre-mixed solution of trichlorosilane (4.0 grams, 29.5 millimoles) and platinum (0)-1,3-divinyl-1,1,3,3-tetramethyldisiloxane complex in o-xylene was added. The reaction mixture was heated to 110° C. Additional trichlorosilane (4.0 grams, 29.5 millimoles) was added after 2 hours. The mixture was maintained at 110° C. for 16 hours, after which the mixture was cooled down and the solvent and unreacted trichlorosilane were removed under vacuum. 4.0 grams of the silyl-terminated HDPE product was brought into an N$_2$-filled glovebox. A pre-mixed suspension of fumed silica (7 nm diameter, specific surface area 395 m$^2$/g, 1.0 grams, 17 millimoles) in TCB (50 grams), anhydrous pyridine (0.1 gram, 1.26 millimoles) and TCB (120 milliliters) were added. The mixture was heated to 110° C. with stirring for 16 hours. After that, the mixture was cooled down and the solvent was removed under vacuum. The product was washed by methanol and thoroughly dried under vacuum.

Preparation of Inventive HDPE-silica Chemical Hybrid

Example 5

A round-bottomed flask was charged with HDPE (High Density Polyethylene) (number average molecular weight 34,000 g/mole by Proton Nuclear Magnetic Resonance, —CH=CH$_2$ end-functionalized) (5.0 grams, 0.147 millimoles) and anhydrous o-xylene (150 milliliters). The HDPE was prepared using a single site catalyst and having a molecular weight distribution within a range from 1.8 to 3.0. The flask was equipped with a chilled-water condenser. The mixture was heated to 110° C. with vigorous stirring under nitrogen to form a homogeneous solution. The solution was cooled down and a pre-mixed solution of trichlorosilane (2.0 grams, 14.8 millimoles) and platinum (0)-1,3-divinyl-1,1,3,3-tetramethyldisiloxane complex in o-xylene was added. The reaction mixture was heated to 110° C. Additional trichlorosilane (2.0 grams, 14.8 millimoles) was added after 2 hours. The mixture was maintained at 110° C. for 16 hours, after which the mixture was cooled down and the solvent and unreacted trichlorosilane were removed under vacuum. 4.0 grams of the silyl-terminated HDPE product was brought into an N$_2$-filled glovebox. A pre-mixed suspension of fumed silica (7 nm diameter, specific surface area 395 m$^2$/g, 2.0 grams, 33 millimoles) in anhydrous o-xylene (100 grams), anhydrous pyridine (0.1 gram, 1.26 millimoles) and anhydrous xylene (150 milliliters) were added. The mixture was heated to 110° C. with stirring for 16 hours. After that, the mixture was cooled down and the solvent was removed under vacuum. The product was washed by methanol and thoroughly dried under vacuum.

Preparation of Comparative HDPE-silica Chemical Hybrid

Example 6

A round-bottomed flask was charged with HDPE (High Density Polyethylene) Paxon™ AL55003 (ExxonMobil Chemical Company, number average molecular weight 15,400 g/mole by Proton Nuclear Magnetic Resonance, —CH=CH$_2$ end-functionalized) (4.0 grams, 0.26 millimoles) and xylene (150 milliliters). This HDPE was prepared using a conventional catalyst and having a molecular weight distribution within a range from 4.0 to 8.0. The mixture was stirred and heated to 110° C. to dissolve. The mixture was then cooled down, and the flask was attached to a chilled water condenser. With the chilled water on, chlorodimethylsilane (2.0 grams) and platinum (0)-1,3-divinyl-1,1,3,3-tetramethyldisiloxane complex in o-xylene (0.01 gram) were added. The mixture was reheated to redissolve the HDPE, and maintained at 110° C. overnight, after which the mixture was cooled down and the solvent and unreacted chlorodimethylsilane were removed under vacuum. The flask was brought into an $N_2$-filled glovebox. Pre-dried fumed silica (0.2 gram), hexamethyldisilazane (0.1 gram) and anhydrous xylene (150 milliliters) were added and the mixture was heated to 110° C. with stirring. After overnight, the mixture was cooled down and the solvent was removed under vacuum. The product was washed by methanol and dried under vacuum. SEM images showed that the silica particles are well dispersed in HDPE.

Preparation of Inventive HDPE-silica Chemical Hybrid

Example 7

A round-bottomed flask was charged with HDPE (number average molecular weight 10,000 g/mole by Proton Nuclear Magnetic Resonance, —CH=$CH_2$ end-functionalized) (2.0 grams, 0.20 millimoles) and xylene (100 milliliters). The HDPE was prepared using a single site catalyst and having a molecular weight distribution within a range from 1.8 to 3.0. The mixture was stirred and heated to 110° C. to dissolve. The mixture was then cooled down, and the flask was attached to a chilled water condenser. With the chilled water on, chlorodimethylsilane (2.0 grams) and platinum (0)-1,3-divinyl-1,1,3,3-tetramethyldisiloxane complex in o-xylene (0.01 gram) were added. The mixture was reheated to redissolve the HDPE, and maintained at 110° C. overnight, after which the mixture was cooled down and the solvent and unreacted chlorodimethylsilane were removed under vacuum. The flask was brought into an $N_2$-filled glovebox. Pre-dried fumed silica (0.602 gram), hexamethyldisilazane (0.12 gram) and anhydrous xylene (150 milliliters) were added and the mixture was heated to 110° C. with stirring. After overnight, the mixture was cooled down and the solvent was removed under vacuum. The product was washed by methanol and dried under vacuum.

Preparation of Inventive HDPE-silica Chemical Hybrid

Example 8

A round-bottomed flask was charged with HDPE (number average molecular weight 19,600 g/mole by Proton Nuclear Magnetic Resonance, —CH=$CH_2$ end-functionalized) (2.0 grams, 0.102 millimoles) and xylene (100 milliliters). The HDPE was prepared using a single site catalyst and having a molecular weight distribution within a range from 1.8 to 3.0. The mixture was stirred and heated to 110° C. to dissolve. The mixture was then cooled down, and the flask was attached to a chilled water condenser. With the chilled water on, chlorodimethylsilane (1 gram) and Pt catalyst solution (0.01 gram) were added. The mixture was reheated to redissolve the PE, and maintained at 110° C. overnight, after which the mixture was cooled down and the solvent and unreacted chlorodimethylsilane were removed under vacuum. The flask was brought into an $N_2$-filled glovebox. Pre-dried fumed silica (0.303 gram), hexamethyldisilazane (0.1 gram) and anhydrous xylene (150 milliliters) were added and the mixture was heated to 110° C. with stirring. After overnight, the mixture was cooled down and the solvent was removed under vacuum. The product was washed by methanol and dried under vacuum.

Grafting Density Measurement

Chemical grafting of HDPE on silica was confirmed and quantified by Soxhlet extraction experiment, in which the HDPE-silica product (Example 2, 2.045 grams, composed of 0.267 gram silica and 1.778 grams HDPE) was weighed in a Soxhlet thimble and washed by condensed toluene vapor repetitively to remove the ungrafted HDPE. The residue in the thimble is the HDPE-hybrid-silica (HDPE-h-silica), which was thoroughly dried under vacuum to remove solvent and then weighed to be 0.652 gram. This method determines the weight ratio of HDPE and silica in the HDPE-h-silica, (0.652-0.267):0.267=1.44, hence the grafting density of HDPE on silica (0.065 chain/$nm^2$), given the molecular weight of HDPE and surface area of silica.

Using similar method, grafting densities of other HDPE-silica chemical hybrid were calculated and results are listed in Table 1.

TABLE 1

Grafting Density of HDPE on Silica in HDPE-silica chemical hybrid

| Example | Solvent of grafting reaction | Silica wt % | Mn of HDPE | Grafted PE/silica (wt %) | Grafting density (chain/$nm^2$) |
|---|---|---|---|---|---|
| 1 | TCB | 2% | 28,000 | 1.60 | 0.087 |
| 2 | o-xylene | 13% | 34,000 | 1.44 | 0.065 |
| 3 | TCB | 13% | 26,000 | 0.70 | 0.040 |
| 4 | TCB | 20% | 26,000 | 0.45 | 0.026 |
| 5 | o-xylene | 33% | 34,000 | 0.14 | 0.007 |

Preparation of HDPE-silica Physical Blend

Example 9

A round-bottomed flask was charged with HDPE (number average molecular weight 28,000 g/mole by Proton Nuclear Magnetic Resonance, —CH=$CH_2$ end-functionalized) (10.0 grams, 0.357 millimoles), a pre-mixed suspension of fumed silica (1.5 grams) in o-xylene (75 grams) and additional o-xylene (300 milliliters). The mixture was heated to 110° C. with vigorous stirring under nitrogen to form a homogeneous solution. The solution was cooled down and the solvent was removed under vacuum. The product was washed by methanol and dried under vacuum.

Extrusion and Mechanical Testing

The HDPE-silica chemical hybrids and physical blends in above examples were extruded using a DSM twin-screw miniature extrusion mixer running at 180-185° C., 50 RPM, and for 3 minutes. 0.1% of BHT stabilizer was added. Modulus and Izod impact strength data are summarized in Table 2. The HDPE-silica chemical hybrid or physical blend was extruded as is, without further blending with other polyolefin or additional HDPE. Meanwhile, the ungrafted HDPE was not removed and serve as the "polyolefin matrix" for the HDPE-h-silica. In Table 2, the "silica wt %" or "vol %" refers to the percentage of silica in the entire hybrid, the remainder being HDPE, including both grafted and ungrafted (serving as a matrix).

TABLE 2

Mechanical Properties of HDPE-Silica HDPE-silica chemical hybrid and Physical Blend

| Description | Example # | silica wt % | silica vol % | Young's modulus (MPa) | Izod impact strength at −30° C. (J/m) |
|---|---|---|---|---|---|
| HDPE | | 0% | 0.00% | 608 ± 53* | 46.2 ± 12.6* |
| HDPE-silica chemical hybrid | 1 | 2% | 0.87% | 604 | 74.0 |
| HDPE-silica chemical hybrid | 2 | 13% | 6.06% | 559 | 146 |
| HDPE-silica chemical hybrid | 3 | 13% | 6.06% | 564 | 157 |
| HDPE-silica chemical hybrid | 4 | 20% | 9.74% | 938 | 98.8 |
| HDPE-silica chemical hybrid | 5 | 33% | 17.54% | 839 | 59.3 |
| physical blend | 9 | 13% | 6.06% | 878 | 23.3 |

*Data averaged from 4 vinyl-terminated HDPE samples that are represent the starting materials for the HDPE-silica chemical hybrid.

Young's Modulus was determined according to ASTM D638. Izod Impact was determined according to ASTM D256A.

Now, having described the various features of the silane functionalized polyolefins, polyolefin-filler hybrids, and nanocomposites therefrom, described here in numbered paragraphs is:

P1. A method of forming a polyolefin-filler hybrid comprising (or consisting essentially of, or consisting of):
   a) combining vinyl/vinylidene-terminated polyolefin (VTP) and halosilane to form a silane functionalized polyolefin, followed by:
      (i) combining the silane functionalized polyolefin with a hydroxyl-containing filler, and/or
      (ii) combining the silane functionalized polyolefin with water and combining with hydroxyl-containing filler;
   b) to form a polyolefin-filler hybrid.

P2. The method of numbered paragraph 1, wherein the vinyl/vinylidene-terminated polyolefin has a molecular weight distribution (Mw/Mn) of less than 3.0 or 4.0.

P3. The method of numbered paragraphs 1 or 2, wherein the vinyl/vinylidene-terminated polyolefin has a weight average molecular weight (Mw) within the range from 3,000, or 4,000, or 5,000, or 10,000 g/mole to 25,000, or 30,000, or 40,000, or 50,000 g/mole.

P4. The method of any one of the previous numbered paragraphs, wherein the polyolefin-filler hybrid has a grafting density within the range from 0.01, or 0.02, or 0.04 chain/nm$^2$ to 0.09, or 0.10, or 0.12, or 0.14, or 0.16 chain/nm$^2$.

P5. The method of any one of the previous numbered paragraphs, wherein the VTP and halosilane are combined with a vinylsiloxane/metal catalyst at a temperature of at least 90° C.

P6. The method of numbered paragraph 3, wherein after combining the catalyst, additional halosilane is combined and maintained at a temperature of at least 90° C. for at least 5, or 8, or 10 hours.

P7. The method of any one of the previous numbered paragraphs, wherein the combining of the hydroxyl-containing filler is also at a temperature of at least 90° C. for at least an additional 5, or 8, or 10 hours.

P8. The method of any one of the previous numbered paragraphs, wherein the silane functionalized polyolefins are silane functionalized polypropylenes (homopolymers, copolymers, elastomers), polyethylenes (HDPE, LDPE, LLDPE, plastomers), or ethylene-propylene copolymers (copolymers, terpolymers, diene terpolymers); preferably high density polyethylene.

P9. The method of any one of the previous numbered paragraphs, wherein the halosilane is selected from the group consisting of trichlorosilane, tribromoasilane, chlorodimethylsilane, bromodimethylsilane, dibromomethylsilane, dichloromethylsilane, and combinations thereof.

P10. The method of any one of the previous numbered paragraphs, wherein the solvent used in steps (i) and/or (ii) has a dielectric constant within a range from 2.0, or 2.5 to 3.0, or 4.0, or 5.0, or 6.0, or 10.0 at 20° C.

P11. The method of any one of the previous numbered paragraphs, wherein the hydroxyl-containing filler is selected from the group consisting of silicates, aluminates, borates, silica, quartz, glass, alumina, aluminosilicates, silicon, copper, copper oxide, tin, tin oxide, talc, iron oxide, chromium oxide, steel, iron, nickel, zinc, lead, surface treated or oxidized carbon, and calcium carbonate, and mixtures thereof.

P12. The method of any one of the previous numbered paragraphs, where the hydroxyl-containing filler having an average particle diameter less than 0.1 μm, or within a range from 0.1, or 1 nm to 10, or 20 nm.

P13. The method of any one of the previous numbered paragraphs, further comprising combining the polyolefin-filler hybrid with at least one polyolefin selected from polypropylene, polyethylene, and ethylene-propylene copolymer to form a polyolefin nanocomposite.

P14. The polyolefin nanocomposite made according to numbered paragraph 13, wherein the polyolefin is a high density polyethylene.

P15. The polyolefin nanocomposite made according to numbered paragraphs 13-14, wherein the polyolefin-filler hybrid is present within a range from 0.50, or 1.0, or 5 wt % to 6, or 10, or 15, or 20, or 25, or 30, or 35, or 40 wt % based on the weight of the polyolefin and silane functionalized polyolefin.

P16. The polyolefin nanocomposite made according to numbered paragraphs 13-15, the nanocomposite having a Young's Modulus of greater than 500, or 550, or 600 MPa, or within a range from 500, or 550 MPa to 1000, or 1200, or 1400 MPa.

P17. The polyolefin nanocomposite made according to numbered paragraphs 13-16, the nanocomposite having an Izod Impact (−30° C.) of greater than 20, or 50, or 100 J/m, or within a range from 20, or 50 J/m to 100, or 150 J/m.

P18. Roto-molded articles, pipes, automotive components, and constructional materials comprising the polyolefin nanocomposite of numbered paragraphs 13-17.

P19. A polyolefin-filler hybrid made by the process of any one of the previous numbered paragraphs, comprising an associated blend of a silane functionalized polyolefin and a hydroxyl-containing filler (HCF):

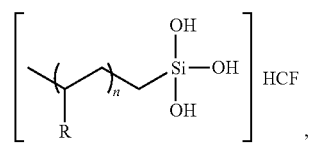

wherein R is selected from hydrogen and C1 to C10 linear alkyls; and n has a value within the range from 40 to 1000.

Also disclosed herein is the use of a polyolefin-filler hybrid as described; and more particularly, the use of a polyolefin-filler hybrid in an article as described.

The phase "consisting essentially of" in a composition means that no other additives are present in the composition being referred to other than those named, or, if present, are present to a level no greater than 0.5, or 1.0, or 2.0, or 4.0 wt % by weight of the composition; and in a process, "consisting essentially of" means that no other major process step is present that effects the formation of covalent, ionic, or other chemical bonds between two or more moieties.

For all jurisdictions in which the doctrine of "incorporation by reference" applies, all of the test methods, patent publications, patents and reference articles are hereby incorporated by reference either in their entirety or for the relevant portion for which they are referenced.

What is claimed is:

1. A method of forming a polyolefin-filler hybrid comprising:
   a) combining vinyl/vinylidene-terminated polyolefin (VTP) and halosilane to form a silane functionalized polyolefin, followed by:
      (i) combining the silane functionalized polyolefin with a hydroxyl-containing filler, and/or
      (ii) combining the silane functionalized polyolefin with water and combining with the hydroxyl-containing filler;
   b) recovering a polyolefin-filler hybrid;
   wherein a solvent is also combined in steps (i) and/or (ii) having a dielectric constant within a range from 2.0 to 10.0 at 20° C.

2. The method of claim 1, wherein the vinyl/vinylidene-terminated polyolefin has a molecular weight distribution (Mw/Mn) of less than 4.0.

3. The method of claim 1, wherein the vinyl/vinylidene-terminated polyolefin has a weight average molecular weight (Mw) within the range from 3,000 g/mole to 50,000 g/mole.

4. The method of claim 1, wherein the polyolefin-filler hybrid has a grafting density within the range from 0.01 chain/nm$^2$ to 0.16 chain/nm$^2$.

5. The method of claim 1, wherein the VTP and halosilane are combined with a vinylsiloxane/metal catalyst at a temperature of at least 90° C.

6. The method of claim 5, wherein after combining the catalyst, additional halosilane is combined and maintained at a temperature of at least 90° C. for at least 5 hours.

7. The method of claim 1, wherein the combining of the hydroxyl-containing filler is also at a temperature of at least 90° C. for at least an additional 5 hours.

8. The method of claim 1, wherein the silane functionalized polyolefin is a silane functionalized polypropylene, a polyethylene, or an ethylene-propylene copolymer.

9. The method of claim 1, wherein the halosilane is selected from the group consisting of trichlorosilane, tribromoasilane, chlorodimethylsilane, bromodimethylsilane, dibromomethylsilane, dichloromethylsilane, and combinations thereof.

10. The method of claim 1, wherein the solvent used in steps (i) and/or (ii) has a dielectric constant within a range from 2.5 to 10.0 at 20° C.

11. The method of claim 1, wherein the hydroxyl-containing filler is selected from the group consisting of silicates, aluminates, borates, silica, quartz, glass, alumina, alumino-silicates, silicon, copper, copper oxide, tin, tin oxide, talc, iron oxide, chromium oxide, steel, iron, nickel, zinc, lead, surface treated or oxidized carbon, and calcium carbonate, and mixtures thereof.

12. The method of claim 1, where the hydroxyl-containing filler has an average particle diameter of less than 0.1 µm.

13. The method of claim 1, further comprising combining the polyolefin-filler hybrid with at least one polyolefin selected from polypropylene, polyethylene, and ethylene-propylene copolymer to form a polyolefin nanocomposite.

* * * * *